United States Patent [19]

Nobles et al.

[11] Patent Number: 5,477,811

[45] Date of Patent: Dec. 26, 1995

[54] HAY BALE FEEDING TRAILER

[76] Inventors: Haskell Nobles, 202 Rosewood Dr.; Howard L. Cagle, Rte. 2, Box 150-AA, both of Poteau, Okla. 74953

[21] Appl. No.: 247,299

[22] Filed: May 23, 1994

[51] Int. Cl.$^6$ ............................................. A01K 5/00
[52] U.S. Cl. ........................................ 119/60; 414/24.5
[58] Field of Search .................. 119/58, 59, 60; 280/416.2, 475, 79.6, 188, 47.33; 296/6, 8; 414/24.5

[56] References Cited

U.S. PATENT DOCUMENTS

| | | | |
|---|---|---|---|
| 1,141,112 | 6/1915 | Ewing | 296/6 |
| 3,881,449 | 5/1975 | Burrack et al. | 119/60 |
| 3,890,933 | 6/1975 | Boehm | 119/60 |
| 3,949,706 | 4/1976 | Coon, Jr. | 119/60 |
| 3,972,308 | 8/1976 | Ray | 119/60 |
| 3,995,594 | 12/1976 | Rose | 119/60 |
| 4,002,147 | 1/1977 | Feterl | 119/60 |
| 4,020,794 | 5/1977 | Nethery | 119/58 |
| 4,067,298 | 1/1978 | Jones et al. | 119/60 |
| 4,237,821 | 12/1980 | Haines | 119/60 |
| 4,330,231 | 5/1982 | Brewer | 119/60 |
| 4,930,449 | 6/1990 | Harton | 119/60 |
| 4,940,096 | 7/1990 | Johnson | 172/443 |
| 4,981,407 | 1/1991 | Johnson | 414/24.5 |
| 4,991,895 | 2/1991 | Artho | 296/6 |
| 5,076,752 | 12/1991 | Rader | 414/470 |
| 5,290,133 | 3/1994 | Riley | 414/24.5 |

*Primary Examiner*—Todd E. Manahan
*Attorney, Agent, or Firm*—Head & Johnson

[57] ABSTRACT

A trailer for large round hay bales is supported by wheels at its rear end and connectable to a vehicle hitch at its front end. The basic framework is made of smooth contoured tubing that supports the bale(s) yet provides ample space for a plurality of animals to safely feed all around the trailer. A transporting vehicle for the trailer includes a special hitch that includes a bale lift and support tine. There is a storage collar for the tine while the vehicle is attached to the trailer. When detached from the trailer, the tine is connected longitudinally rearward to stab bales and load same onto the trailer. The trailer includes a rear hinged gate and a top cover.

10 Claims, 7 Drawing Sheets

HAY BALE FEEDING TRAILER

BACKGROUND OF THE INVENTION

This invention relates to a trailer for receiving and transporting large cylindrical bales of hay and which also serves as a feeding station when trailed and positioned at a cattle feeding sight.

It has been a problem on farms where large amounts of feed for cattle are used daily and weekly in that large amounts of hay, particularly when feeding large round bales, is wasted. These hay bales found on modern farms are extremely large and heavy, weighing upwards of 1500 pounds each. When the bales are placed upon the ground for feeding, as much as one-half of the bale is wasted. The bales of this type are several feet in diameter, and consequently present difficult handling problems in transporting the bales to a feeding sight. When at the feeding sight if upon the ground, the animals ruin a substantial quantity of the hay by trampling, lying in it, and polluting it. Once polluted, the hay is completely wasted, since the animals will not consume it. In some instances, ranchers have employed hay racks and bunks when feeding the small, conventional square type of hay bales. Such equipment is not capable of use with the large round bales. The animals will eat at the sides and middle of the bale, causing its collapse, resulting in the trampling and polluting as set forth above.

The known prior art showing various types of wagons to solve this problem are found in the following U.S. Pat. Nos. 3,890,933, Boehm; 4,067,298, Jones et al.; 4,237,821, Haines; 5,076,752, Rader; 3,949,706, Coon, Jr.; 3,881,449, Burrack et al.; and 3,972,308, Ray. However, most of these devices do not allow full and unrestricted feeding of the livestock, or they restrain the cattle from wasting the feed and thus, restrict the volume of accessible feed.

Another problem exists in that the loading of the hay bales and the transport of the hay bales many times requires the use of separate loading and transporting mechanisms and vehicles.

SUMMARY OF THE INVENTION

Accordingly, it is an object of this invention to provide a large round hay bale trailer that is simple in construction which can be transported to a feeding sight and retains the hay to prevent the pollution thereof by the cattle.

It is a further object of this invention to provide a simplified construction trailer and means in association with the transporting vehicle to provide the dual purpose of loading the trailer and transporting the trailer to the feeding sight.

It is another object of the invention to provide a trailer for large hay bales wherein the animals can eat from any place surrounding the trailer by, i.e., sides, front and back.

A yet further object of the invention is to provide a feeder of round bales of hay that includes a roof to protect and keep the hay dry. A yet further object of the invention is to provide a trailer for large hay bales in which the trailer is essentially self-cleaning in that the debris will fall out when the trailer is moved. These and other objects of the invention will become apparent upon further reading of the specification, drawings and claims.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
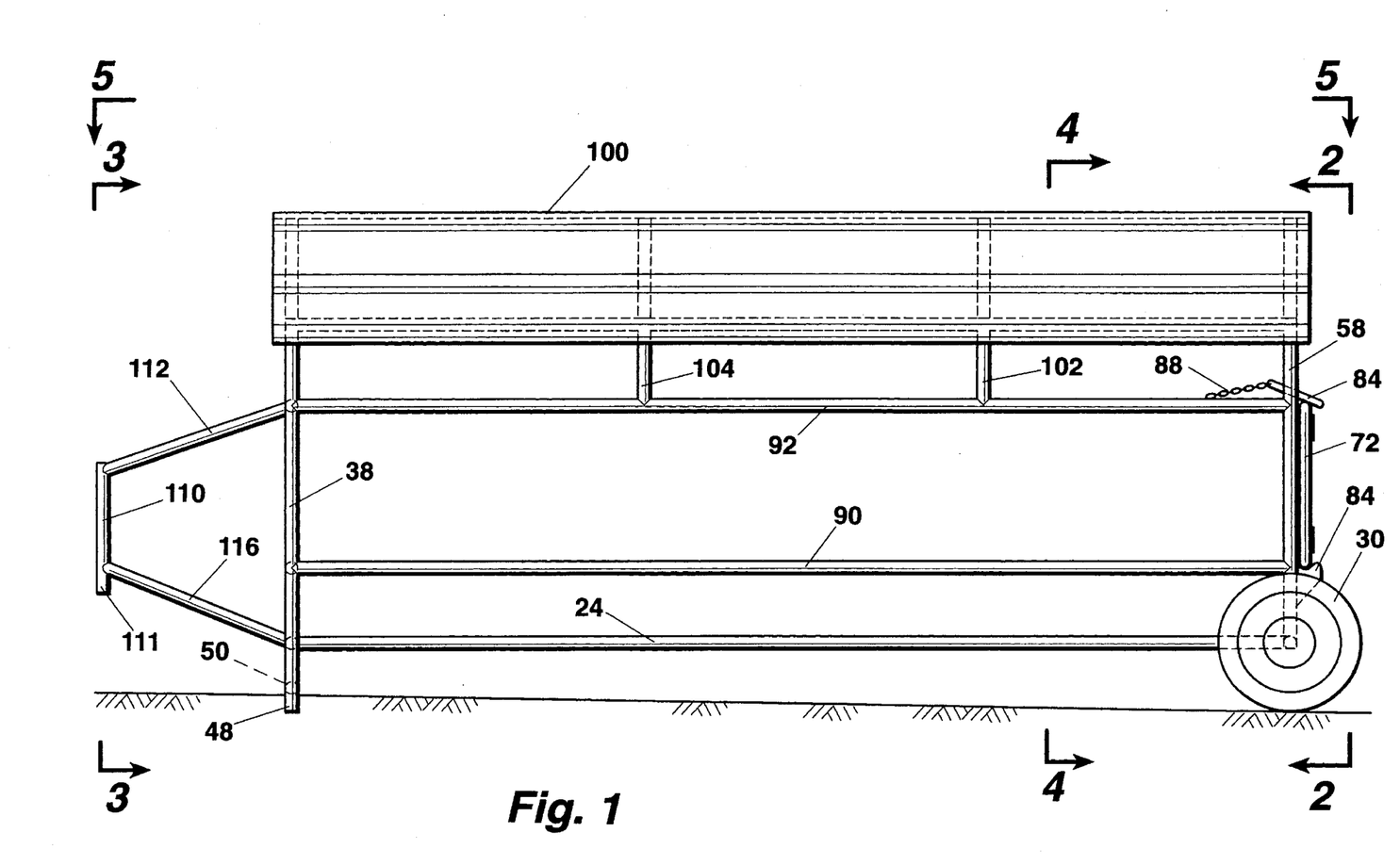
FIG. 1 is a side elevational view of the trailer of this invention.

FIGS. 1–5 depict the simplistic instruction of this invention made primarily from round metal tubular stock. A forward horizontal lower frame is made up of a forward horizontal tubing 20 connected by a bottom pair of parallel longitudinally spaced tubes 24 and 26. These tubes provide the main vertical support for the hay bales shown dotted as 28. The rear horizontal frame 22 also provides means for attachment of the ground support wheels 30 and 32. A forward vertical frame generally designated by the numeral 36 comprises spaced and parallel upright members 38 and 40 with additional support being provided by the horizontal tubing members 42 and 44 and lower support member 46. Horizontal support member 46 and extended portions 48 and 50 formed as a part of vertical members 38 and 40 provide means for preventing movement of the trailer as the weight on the trailer will cause these legs to sink into the ground and thus, stop forward movement of the trailer, especially during the loading operation of one or more bales 28. At the rear of the trailer is a framework formed by vertical tubing 56 and by parallel and spaced vertical tubing 56 and 58 which are attached to the horizontal member 22. The rear end of the trailer is essentially open to permit loading the large round bales which can be readily pushed forward on the round tubing 24 and 26. The size of the trailer is dependent upon the size and number of bales of hay desired to be transported, in some instances, upwards of three or four bales. The rear frame is closed by a gate generally designated by the numeral 60, referring to FIG. 3, the gate comprises parallel horizontal members 62 and 64 with vertical members 66, 68, 70 and 72. The gate includes a suitable hinge means 74 and 76 which will allow it to swing completely away from the rear of the trailer for loading purposes. Means to retain the gate in the latched position include, as shown in FIGS. 6 and 7, a lower gate retainer slot 80 includes a groove 82 upon which the gate member 64 will rest. To maintain the gate locked, a retaining pin 84 is adapted to be place within an opening 86. The latch 84 is retained by a chain 88 so as to be maintained accessible and prevent loss. The sides of the vehicle are formed by spaced and parallel longitudinal tubes 90 and 92 as shown in FIG. 1 on one side while a similar arrangement on the other side is shown by tubes 94 and 96. The side longitudinal members are connected to and between the forward and rearward vertical frames 38, 58, 40 and 56 respectively and are spaced so as to provide ample room, e.g., 2½ feet (0.75 meters) apart, for a plurality of cattle to feed along the sides, front and rear of the trailer when positioned at the feeding sight. That same distance is adequate for the bottom support tubes 24 and 26.

Provision is made in the trailer for an arcuate roof 100 which can be made of any material, preferably a galvanized and corrugated steel. The roof is supported longitudinally at least to the forward and rearward vertical frame members 38, 40, 56 and 58 and may include other supports as shown in FIG. 1 and identified as 102 and 104.

Figure 2:
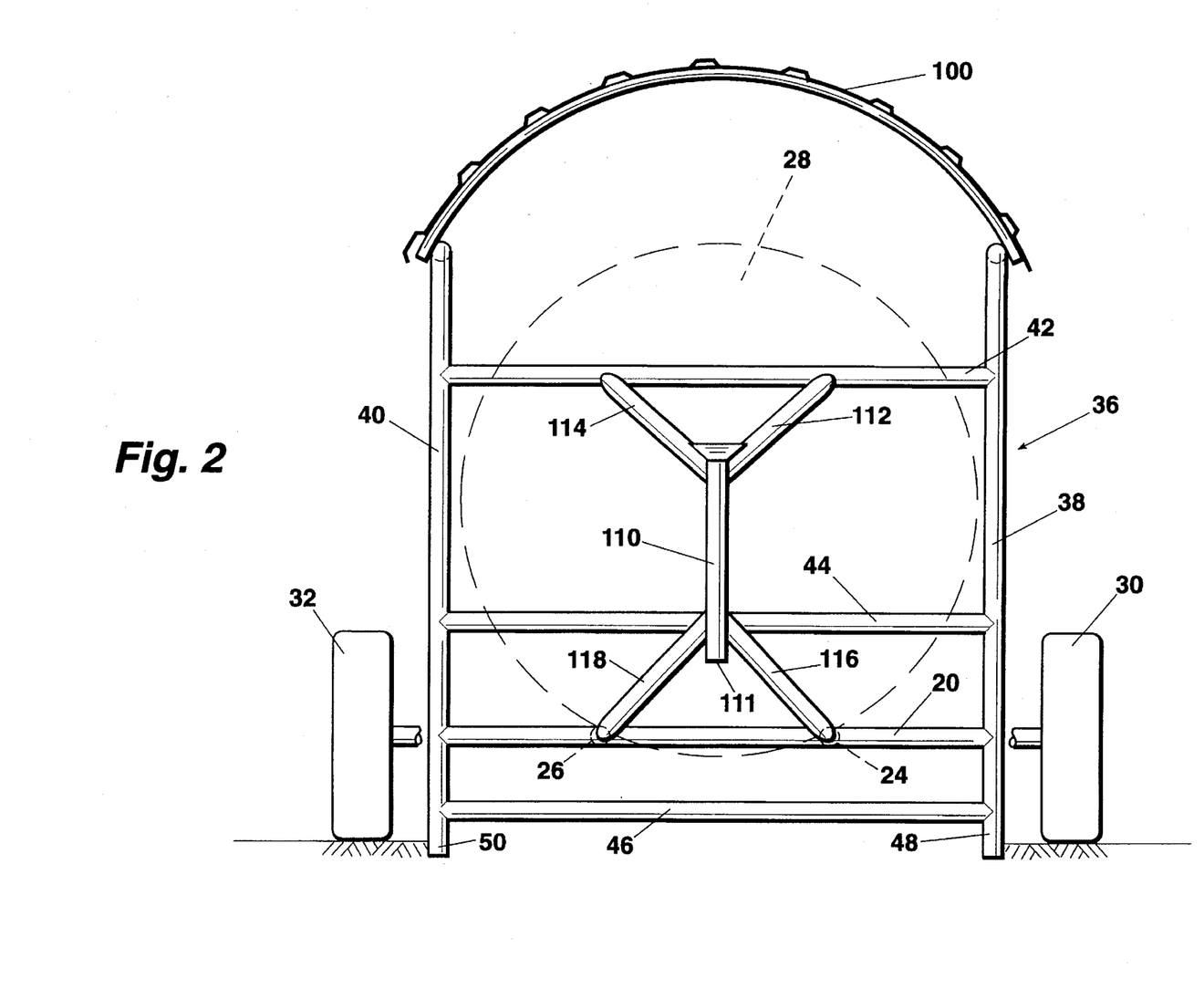
FIG. 2 is a front end view of the trailer.
Figure 3:
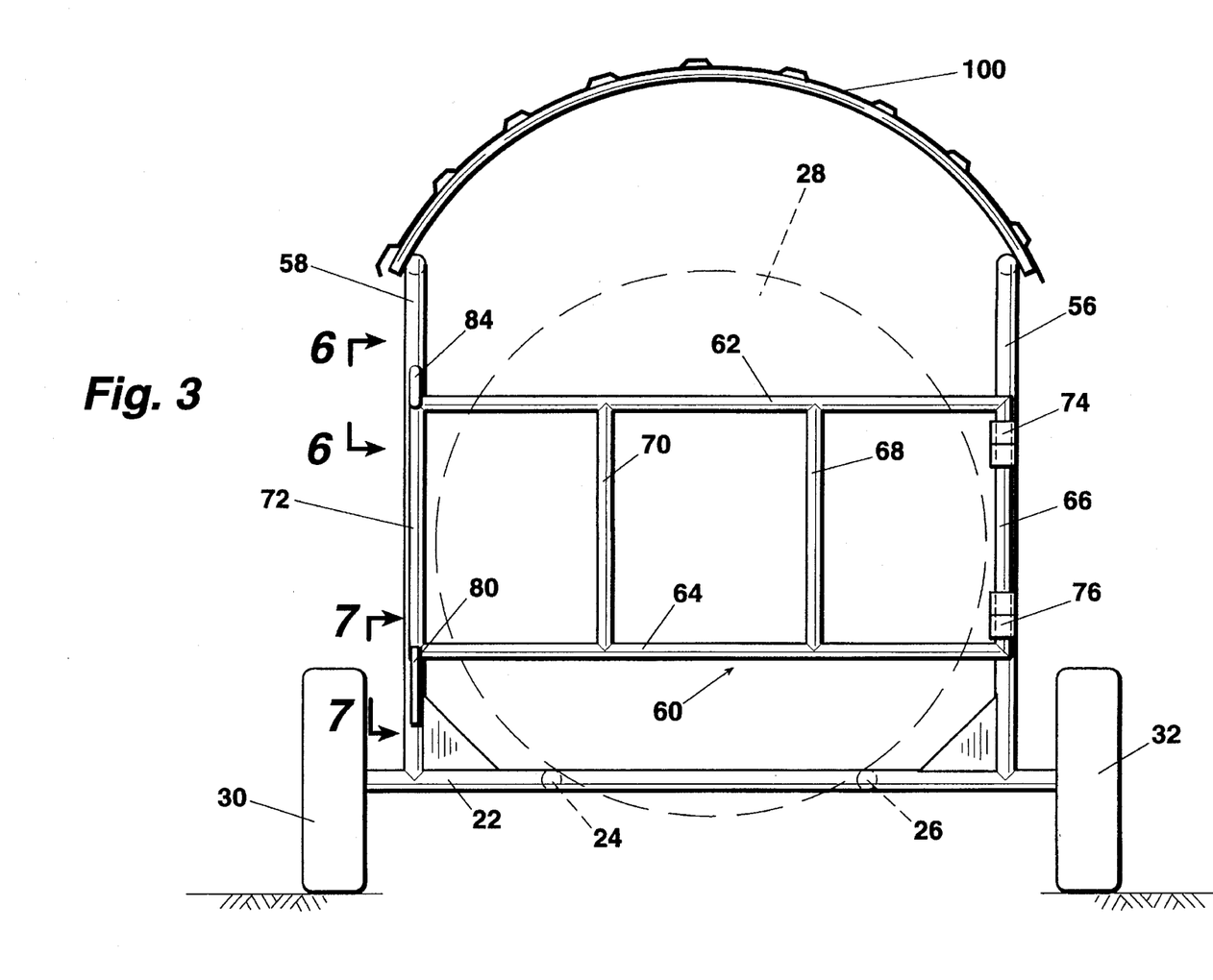
FIG. 3 is a rear end view of the trailer of this invention.
Figures 4, 6, 7:
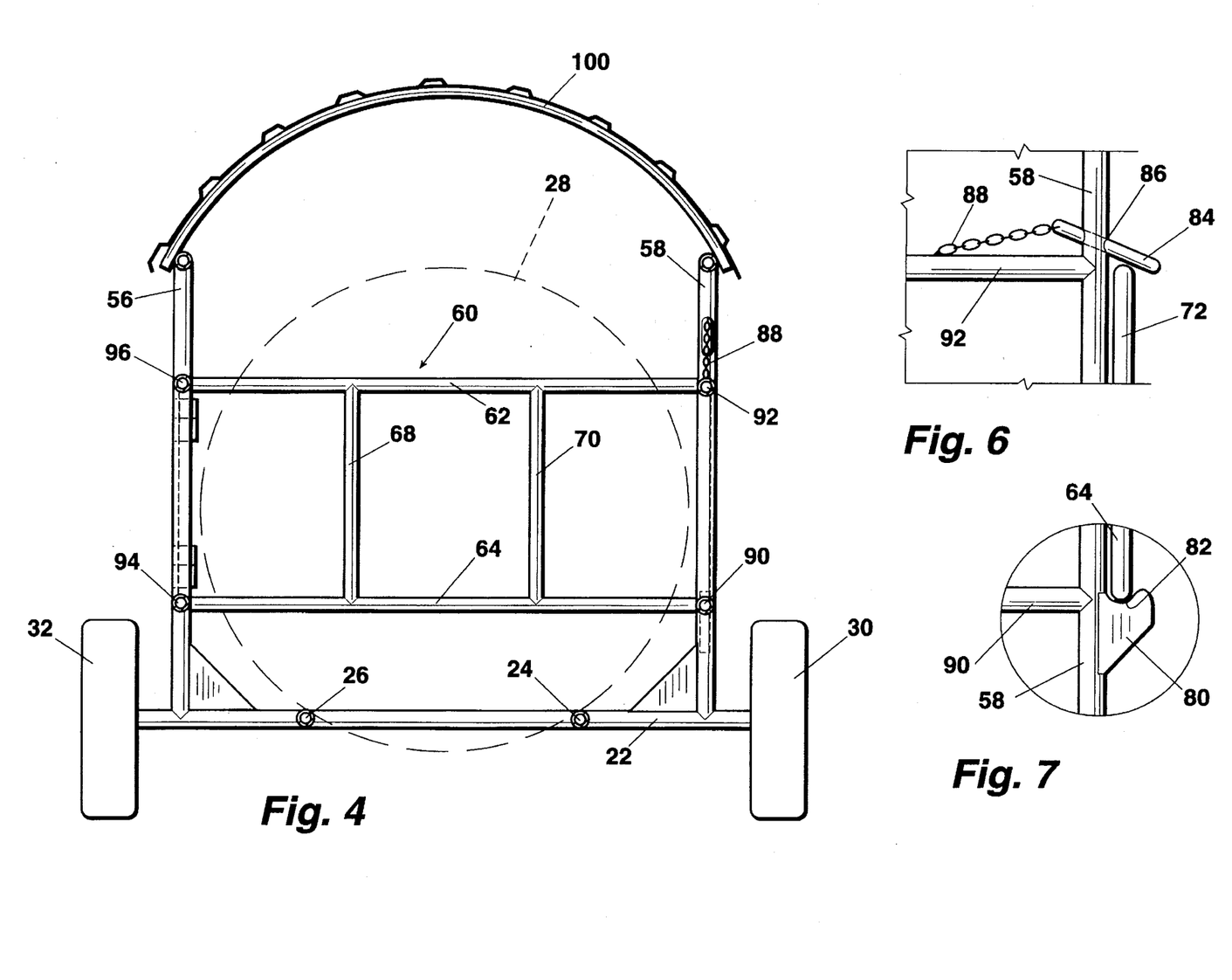
FIG. 4 is a sectional view taken along the line 4—4 of FIG. 1.
FIG. 6 is an enlarged side view of the rear end gate latch taken along the line 6—6 of FIG. 2.
FIG. 7 is an enlarged view of the gate-locking system as taken from the line 7—7 of FIG. 2.
Figure 5:
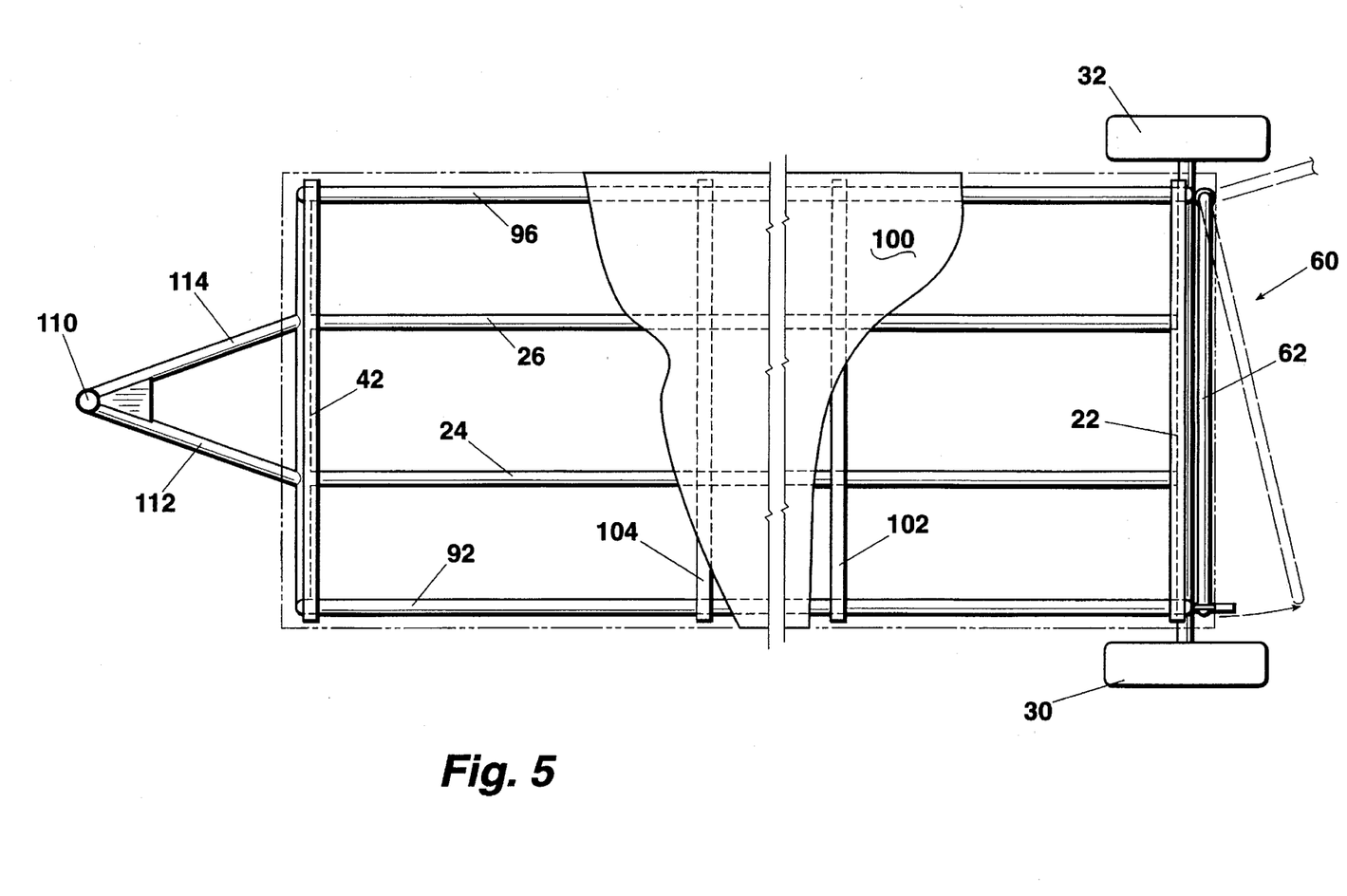
FIG. 5 is a top elevational view showing the roof, partly cut away.

Referring now to FIGS. 1, 2, 5 and 8, the front hitch construction of this invention is disclosed and comprises a vertical member 110 with its lower end adapted to rest upon a ball socket type trailer connection. Member 110 is supported forwardly of the front frame 36 by support arms 112, 114, 118, and 116 as best shown in FIG. 2.

Figure 8:
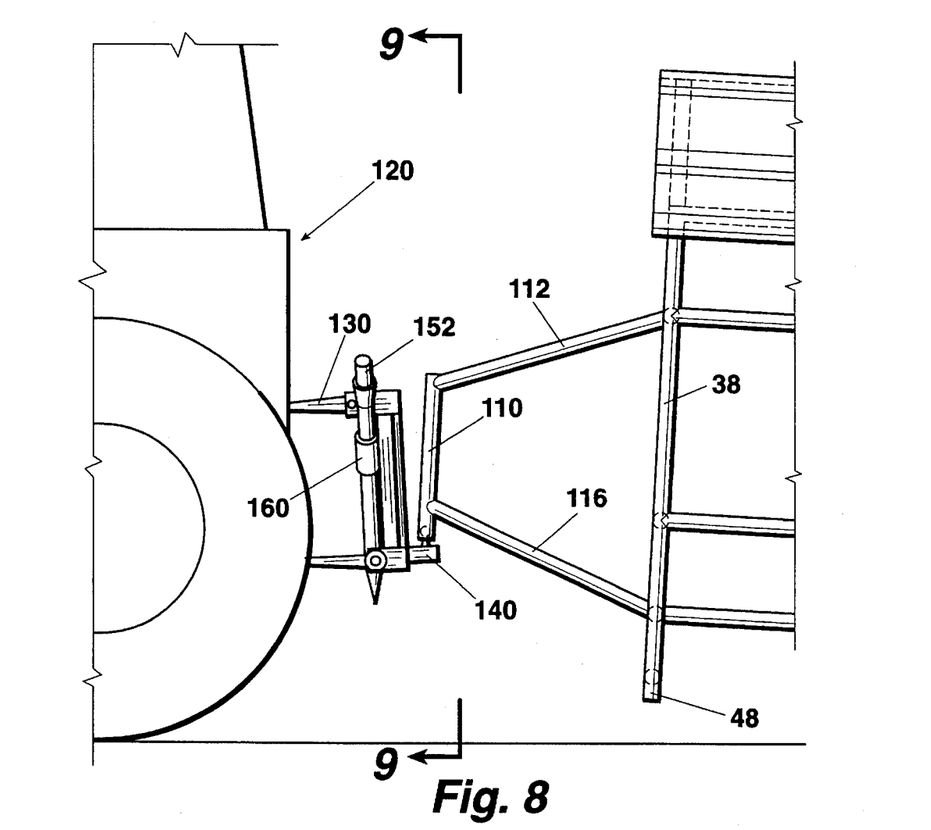
FIG. 8 is a partial side view of the front portion of the trailer of this invention as attached to a special tractor hitch as a part of this invention.
Figure 9:
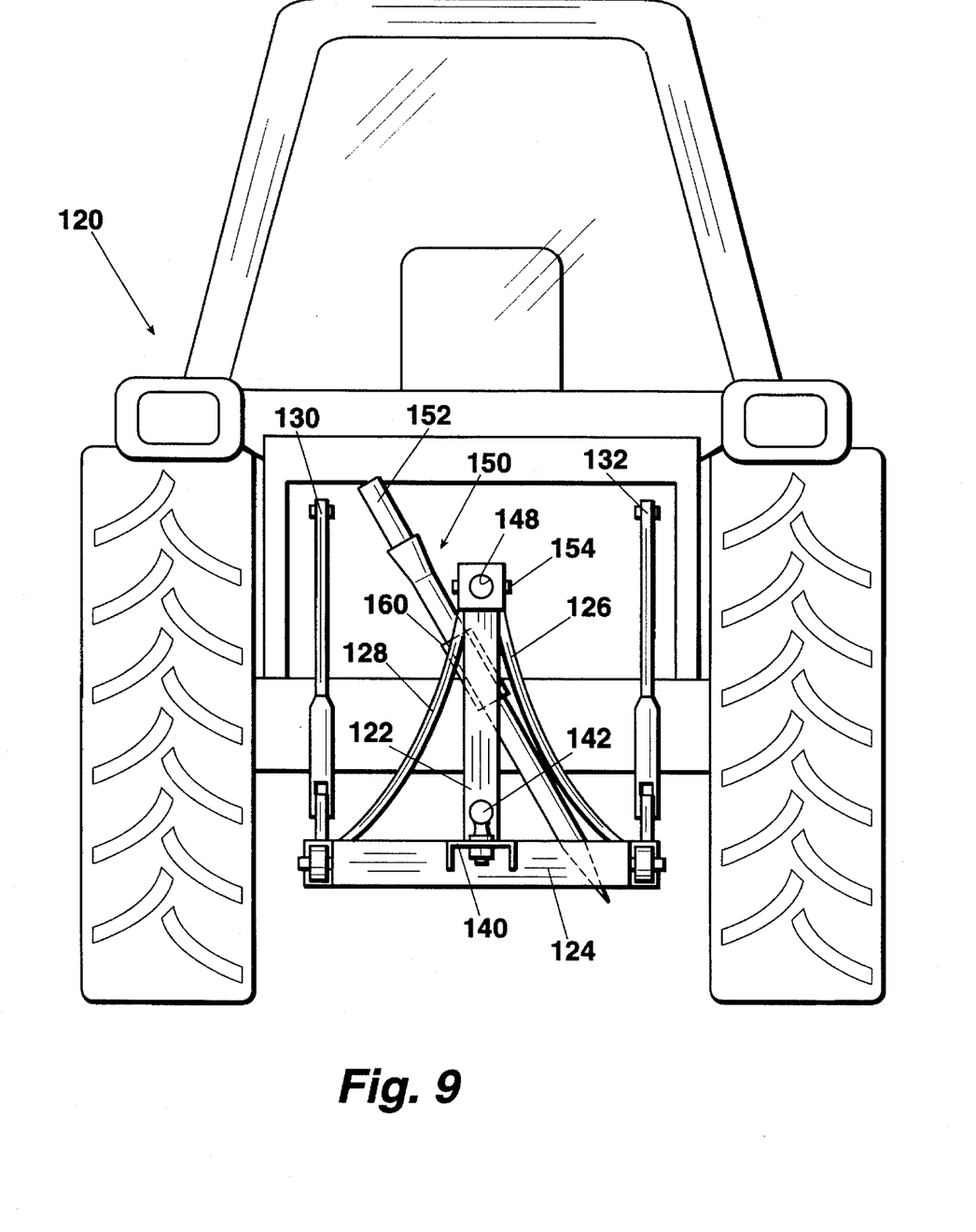
FIG. 9 is a rear view of the transporting vehicle and the special hitch for the trailer taken along a line 9—9 of FIG. 8 with the trailer removed.
Figure 10:
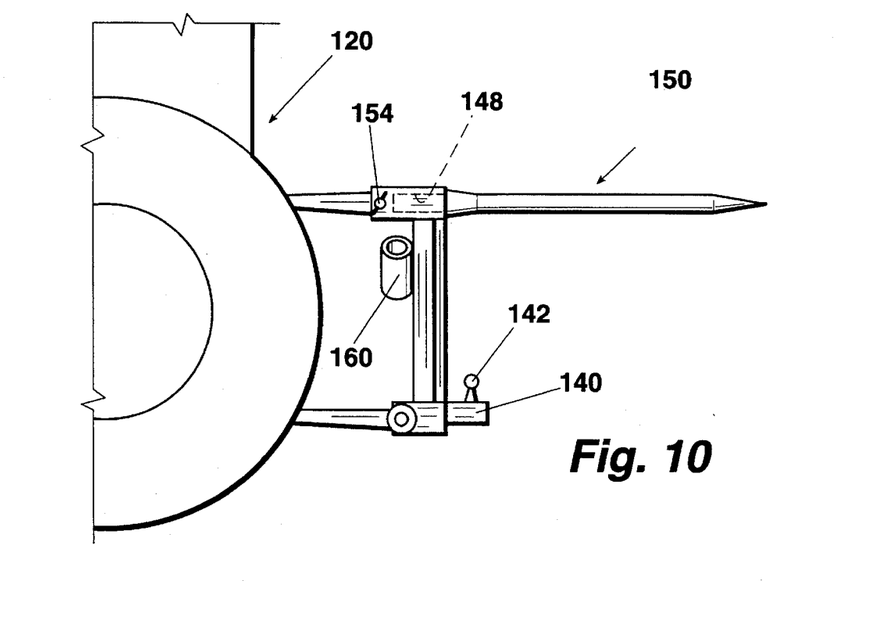
FIG. 10 is a side elevational view of a tractor/trailer hitch of this invention with the hay bale lift tine attached to the hitch.

A unique aspect of this invention is the hitch, which forms a part of the trailer that is attached to a typical three point hitch of a tractor vehicle shown in FIGS. 8, 9 and 10 and identified generally by the numeral 120. The hitch comprises a vertical member 122, a horizontal member 124 with additional side support members 126 and 128, and a means for connection to a typical three point hitch mechanism 130 and 132 for attachment to the tractor 120. Such a mechanism is capable of raising and lowering the front end of the trailer. Extending rearwardly from the hitch is a beam member 140 which has attached thereto a ball 142 for interconnection with the trailer hitch 110. The tractor hitch portion includes at its upper end 148 means adapted to receive the hay bale lift tine generally designated by the numeral 150 by insertion of its end 152 into opening 148 where it can be locked into place with a pin 154. The tine 150 is temporarily retained on the hitch when not in use by an upper sleeve 160 and a lower sleeve, not shown. In use the tine 150, with its sharpened end, is positioned within the socket 148 and retained, as for example by a pin 154, for use when disconnected from the trailer in stabbing a large hay bale, lifting it and then forcing it forward via the rearward opening of the trailer along the lower support tubing 24 and 26 while being maintained laterally stable by the side members 90, 92, 94 and 96. Once the bales have been loaded onto the trailer, the tine 150 is removed and stored. The gate is closed. The tractor is then reattached to the hitch mechanism 110 and 111 and the trailer then transported to the feeding sight wherein the front end is lowered into the ground. The tractor is then removed and cattle are then capable of feeding upon the hay therein from all sides and front and rear of the trailer. As such, when the cattle come to eat, because of the longitudinal and space support members, they cannot get stuck or hurt while feeding. The top 100, of course, helps protect the hay and keep it dry and full of its nutrients. By placing the wheels 30 and 32 on the end, it puts most of the weight of the bales thereon during transport.

Although the size of the pipe is not necessarily material, it has been found that 2⅜" (6 cm) drill pipe provides suitable strength and provides smooth contour because of the roundness of the pipe to prevent cattle from becoming injured.

What is claimed is:

1. An animal feeding trailer for receiving at least one large cylindrical hay bale comprising:

a horizontal lower frame comprised of parallel forward and a rearward horizontal tubing, ground level support wheels connected to said rearward tubing, and a bottom pair of parallel spaced tubes longitudinally and transversely connected to said forward and rearward horizontal tubing;

parallel forward and rearward vertical frame members connected respectively to each end of said forward and rearward horizontal tubing, said forward vertical frame member including a plurality of additional horizontal tubing parallel to said forward horizontal tubing, said forward vertical frame member including at least a pair of vertical legs extending below said forward horizontal tubing so as to be below ground level when said lower frame is substantially parallel with the ground;

a pair of parallel vertically spaced longitudinal tubes forming sides which are connected to and between said forward and rearward vertical frame members;

an arcuate roof extending longitudinally between and supported at least by said forward and rearward vertical frame members;

a gate comprised of an open network of horizontal and vertical tubes hingably supported to open and close said rearward frame member, means to latch said gate when closed; and means to connect said trailer to a vehicle comprising a forward frame attached to said forward vertical frame member.

2. An animal feeding trailer for receiving and transporting at least one large cylindrical hay bale comprising:

parallel and spaced vertical forward and rearward frames, each such frame comprised of parallel vertical members and at least a lower horizontal transverse member, ground support wheels of a given radius connected at each end of said rearward lower horizontal transverse member, said vertical members of said forward frame extending downward a distance greater than said radius;

a bottom pair of parallel bale support members longitudinally connected to each said lower horizontal transverse member, said bail support members positioned inwardly from a longitudinal plane formed by said vertical members;

a pair of parallel vertically spaced longitudinal lateral support members forming sides which are connected to and between said forward and rearward vertical members; and means attached to said forward frame to releasably connect to a vehicle.

3. The trailer of claim 2 wherein said forward and rearward frames, said bale support members and said lateral support members are of a rounded contour.

4. The trailer of claim 3 wherein said rounded contour is formed by tubing.

5. A trailer of claim 3 wherein said means to releasably connect to a vehicle includes a hitch on said vehicle capable of raising and lowering a forward part of said trailer.

6. A trailer of claim 5 wherein said hitch includes a bale lift and support tine and means to store said tine when connected to said trailer and another means to retain said tine longitudinally rearward when disconnected from said trailer to stab said hay bale and transport same to another location.

7. The trailer of claim 2 wherein said lateral support members provide a longitudinal free space for a plurality of animals to feed on said hay bales.

8. The trailer of claim 2 including a gate comprised of an open network of horizontal and vertical members hingably supported to open and close said rearward frame and means to latch said gate when closed.

9. A trailer of claim 8 wherein said members of said gate are comprised of tubing, the open network being sufficient for a plurality of animals to feed on said hay bale through said rearward frame.

10. The trailer of claim 2 including an arcuate roof extending longitudinally and supported at least by said forward and rearward vertical frames.

* * * * *